US008345885B2

(12) United States Patent
Takada

(10) Patent No.: US 8,345,885 B2
(45) Date of Patent: Jan. 1, 2013

(54) SOUND SIGNAL ADJUSTMENT APPARATUS AND METHOD, AND TELEPHONE

(75) Inventor: Masashi Takada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 616 days.

(21) Appl. No.: 12/654,091

(22) Filed: Dec. 10, 2009

(65) Prior Publication Data

US 2010/0184487 A1 Jul. 22, 2010

(30) Foreign Application Priority Data

Jan. 16, 2009 (JP) ................................. 2009-008035

(51) Int. Cl.
| H03G 3/20 | (2006.01) |
| A61F 11/06 | (2006.01) |
| G10K 11/16 | (2006.01) |
| H03B 29/00 | (2006.01) |
| H04R 1/10 | (2006.01) |
| H04M 1/00 | (2006.01) |
| H04M 9/00 | (2006.01) |

(52) U.S. Cl. ....... 381/57; 381/71.6; 381/74; 379/392.01
(58) Field of Classification Search .................. None
See application file for complete search history.

(56) References Cited

U.S. PATENT DOCUMENTS

| 5,412,733 A | * | 5/1995 | Nagayoshi et al. ............. 381/74 |
| 7,260,422 B2 | * | 8/2007 | Knoedgen .................. 455/569.1 |
| 2006/0023870 A1 | * | 2/2006 | Stenmark ................. 379/388.01 |
| 2008/0247560 A1 | * | 10/2008 | Fukuda et al. ............... 381/71.6 |

FOREIGN PATENT DOCUMENTS

| JP | 01-241208 A | 9/1989 |
| JP | 07-038624 A | 2/1995 |
| JP | 07-202998 A | 8/1995 |
| JP | 11-284694 A | 10/1999 |
| JP | 2005-020730 A | 1/2005 |
| JP | 2007-116585 A | 5/2007 |
| JP | 2008-187221 A | 8/2008 |

* cited by examiner

Primary Examiner — Fan Tsang
Assistant Examiner — Jeffrey Lytle
(74) Attorney, Agent, or Firm — Rabin & Berdo, P.C.

(57) ABSTRACT

A telephone with a speaker and a microphone uses the speaker both as an electric-to-acoustic transducer, to reproduce the far end party's voice, and an acoustic-to-electric transducer, to capture external sound in the vicinity of the near end party. From the captured sound signal and the signal picked up by the microphone, a decision unit decides whether or not the external sound is being blocked. When the external sound is blocked, a volume control unit increases the volume of the far end party's voice as reproduced by the speaker. The near end party can accordingly turn up the speaker volume by moving the part of the telephone including the speaker close to the user's ear to block external sound, without having to manipulate any manual controls.

19 Claims, 11 Drawing Sheets

SOUND SIGNAL ADJUSTMENT APPARATUS AND METHOD, AND TELEPHONE

BACKGROUND OF THE INVENTION

1. Field of the Invention

The present invention relates to a sound signal adjustment apparatus and method and a telephone such as a portable telephone.

2. Description of the Related Art

By their nature, portable telephones are used under a wide variety of ambient conditions, frequently outdoors. Often they are used in speaking and listening environments that are inferior to the environments in which landline outdoor telephones are used.

For example, portable telephones are usually used in an exposed environment, rather than an enclosed environment such as a telephone booth. The voices of both parties in the telephone conversation may therefore become hard to hear because of ambient noise. The user can cope with this situation by turning up the volume of the telephone set.

Because of the primary need for portability, however, portable telephones have become extremely small. The buttons and other manual controls of a modern portable telephone are crowded into a small space on the front and sides of the telephone body.

This leads to volume control problems, because often the user of a portable telephone does not realize that the volume setting of the telephone's speaker is too low until after the conversation has begun. To adjust the volume to the proper level, the user must operate the manual volume control, but with today's downsized telephones it is difficult to find the volume control by touch alone. With the increasing number of functions being built into modern portable phones, there is also the risk of operating the wrong control by mistake and activating an unintended function. To adjust the volume, the user must therefore take the telephone away from his or her head so that he or she can see where the volume control is and how to operate it. While the user is adjusting the volume, the distant party, unless warned in advance, will assume that the user is still listening and will continue to talk. The user will accordingly miss part of what the distant party says.

To make matters worse, the distant party may become aware that the user has missed part of the conversation without being aware that this occurred because the user was turning up the volume. The distant party may suspect that the user simply was not paying attention or had lost interest in the conversation, resulting in damage to personal relations between the two parties.

To avoid such problems, Japanese Patent Application Publication (JP) 2005-20730 discloses a portable telephone having a pressure sensor embedded near the speaker to measure mechanical pressure, enabling the user to adjust the volume just by pressing the telephone more or less tightly against his or her ear, without operating any manual controls.

JP H01-241208 discloses terminal equipment with a speaker and a microphone. The equipment uses the microphone to detect the magnitude of ambient noise, and increases the speaker volume in noisy environments.

JP H07-038624 discloses a telephone that has a sensor for sensing the sound pressure in the enclosed space between the earpiece of the handset and the user's ear, and adjusts the earpiece speaker volume accordingly. When the earpiece is pressed tightly against the ear, causing the sound pressure to rise, the volume is reduced; when the earpiece is held only loosely against the ear, causing the sound pressure to fall, the volume is increased.

JP H11-284694 discloses a portable telephone that adjusts its speaker volume according to the volume of the user's voice as picked up by the microphone. When the user raises his or her voice, the speaker volume is increased.

JP 2008-187221 discloses a portable telephone with a camera mounted on the same surface as the telephone's display screen. The image captured by this camera is analyzed; if the number of black picture elements in the image is equal to or greater than a threshold value, indicating that the telephone is being held against the ear, the distant party's voice is output through an ear speaker; otherwise, the distant party's voice is output through a separate hands-free speaker integrated into the telephone body.

JP 2007-116585 discloses a noise canceling device for a conference system with multiple microphones. The device cancels noise by spectral subtraction, subtracting a stored noise pattern corresponding to a selected microphone.

In the context of today's portable telephones, all of the above disclosures are problematic.

One reason is the ever-decreasing size and increasing functionality of portable telephones, noted above. The increasing functionality demands an increasing number of buttons and other manual controls. The decreasing size leaves little room for additional sensors. For example, it is difficult to find space in which to embed the pressure sensor required by JP 2005-20730.

The method disclosed in JP H01-241208 of controlling speaker volume according to the ambient noise level detected by a microphone could in theory be applied to a portable telephone to adjust the speaker volume without requiring an additional sensor, but this method fails to meet all the requirements of a portable telephone. For example, it fails when the user wants to increase the speaker volume, not because of ambient noise, but because the distant party is speaking in a small voice.

JP H07-038624 requires an additional sound pressure sensor, and in any case is inapplicable to portable telephones which, differing from landline telephones, are rarely held tightly to the ear. A more basic problem is that if the user did press a portable telephone against his or her ear in order to hear the distant party's voice better, JP H07-038624 would respond by decreasing the speaker volume, making the distant party's voice even harder to hear.

JP H11-284694 enables the user to increase the speaker volume when desired, without using manual controls, just by raising his or her own voice. A problem is that the user may be using the portable telephone in a quiet environment and may want to increase the speaker volume because the distant party is talking in a small voice. In this case the user may hesitate to raise his or her own voice because that would disturb other people nearby. A more subtle problem is that, since the portable telephone does not distinguish between the user's voice and ambient noise, the speaker volume is automatically increased in response to ambient noise in a noisy environment. Since that makes the distant party's voice easier to hear, the user thinks that he or she does not need to raise his or her own voice and tends not to do so. As a result, the distant party has difficulty hearing the user's voice over the ambient noise.

A problem with JP 2008-187221 is that in almost all camera-equipped portable telephones, the camera is not mounted on the same surface as the display screen; it is mounted on the opposite surface and points away from the user's head. Even in portable telephones with two cameras, front and back, there is the problem that use in a dark environment can cause an unwanted switchover from the hands-free speaker to the ear speaker even though the telephone is distant from the user's head. Furthermore, this camera-based method only provides a way of switching from one speaker to another; it does not provide a method of adjusting the volume of a speaker.

A problem with the spectral subtraction method of JP 2007-116585 is that it does not work well when a microphone is carried from one location to another location with a different ambient noise pattern, a frequent occurrence with portable telephones.

SUMMARY OF THE INVENTION

An object of the present invention is to provide a convenient, practical, and low-cost apparatus and method for adjusting a sound signal in a telephone.

The invention provides a method of adjusting a far end signal in a telephone. The telephone has a microphone that picks up a near end signal, an amplifier that amplifies the far end signal, and a speaker that reproduces the amplified far end signal. The method includes the steps of:

converting external sound reaching the speaker to an external sound signal;

deciding from the external sound signal and the near end signal picked up by the microphone whether the external sound is being externally blocked; and setting the amplifier to a higher gain when the external sound is being externally blocked than when the external sound is not being externally blocked.

The converting step may include using the speaker as an acoustic-to-electric transducer, in which case the speaker itself picks up the external sound signal and the telephone does not require an additional sound sensor.

The method may include the further steps of taking the difference between the frequency spectra of the blocked and unblocked external sound signals, thereby obtaining a difference frequency spectrum, and using the difference frequency spectrum to reduce noise in the near end signal by spectral subtraction.

The above method enables the user to turn up the speaker volume just by pressing the speaker against the user's ear to block external sounds. This operation is natural and intuitive, does not require the manipulation of manual controls, and does not require the user to speak in a loud voice. In addition, the method is under the user's control and the volume will not be unexpectedly changed due to changes in ambient noise or lighting conditions.

The invention also provides a machine-readable medium including instructions executable by a computing device to carry out the above method, a sound signal adjustment apparatus using the above method, and a telephone including the sound signal adjustment apparatus.

BRIEF DESCRIPTION OF THE DRAWINGS

In the attached drawings:

FIG. 2A is a graph illustrating the uncompensated level of the external sound signal picked up by the speaker;

FIG. 2B is a graph illustrating the uncompensated level of the near end signal picked up by the microphone;

DETAILED DESCRIPTION OF THE INVENTION

Figure 1:
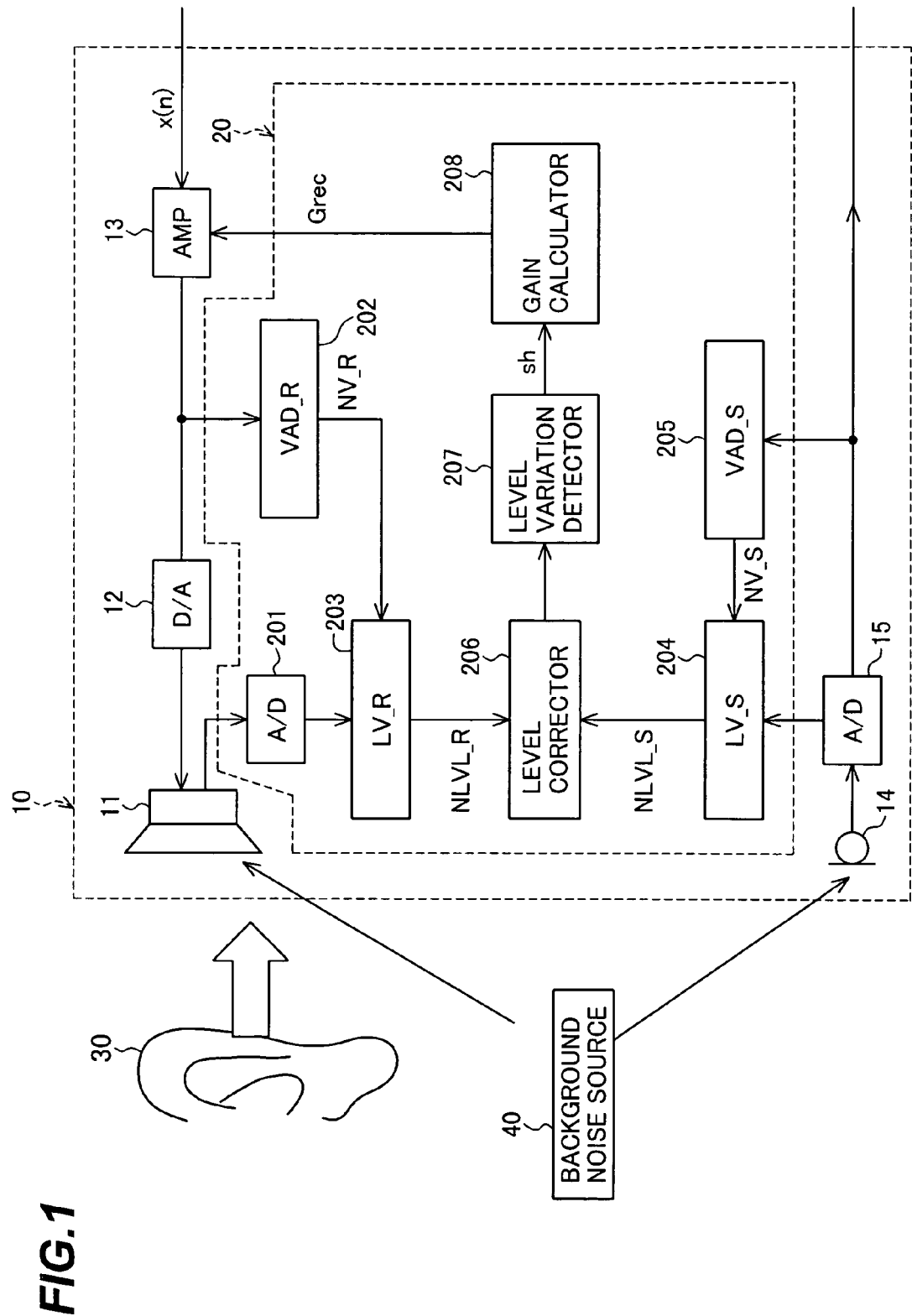
FIG. 1 is a block diagram of a sound signal adjustment apparatus according to a first embodiment of the invention.

Embodiments of the invention will now be described with reference to the attached drawings, in which like elements are indicated by like reference characters. The embodiments are implicitly assumed to be portable telephones.

First Embodiment

Referring to the block diagram in FIG. 1, the first embodiment is a telephone 10 including an ear speaker referred to below simply as a speaker 11, a digital-to-analog converter (DAC) 12, an amplifier (AMP) 13, a microphone 14, an analog-to-digital converter (ADC) 15, a sound signal adjustment apparatus 20, and numerous well-known elements, including pushbuttons and other manual controls, which are not shown.

The telephone 10 receives a far end signal x(n) from a distant party (not shown), reproduces it for the user (whose ear 30 is shown), picks up the user's voice, and transmits the user's voice to the distant party.

More specifically, when the user (also referred to below as the near end party) speaks into the microphone 14, the microphone 14 converts the user's voice to an analog electrical signal, which is converted to a digital signal by ADC 15 and transmitted as a near end signal to the distant party (also referred to below as the far end party).

The far end signal x(n) is amplified by the amplifier 13, converted to an analog electrical signal by the DAC 12, converted to audible sound by the speaker 11, and heard by the near end party, whose ear 30 is positioned in the space close to the speaker 11. Ambient noise from a background noise source 40 may intrude into this space, making the sound reproduced by the speaker 11 hard for the near end party to hear. The level of ambient noise varies over time. The sound signal adjustment apparatus 20 allows the near end party to control the volume of the sound reproduced by the speaker 11 by controlling the gain of the amplifier 13 so that the reproduced sound, representing the far end party's voice, is always easy to hear.

The sound signal adjustment apparatus 20 includes an ADC 201, a receiving voice activity detector (VAD_R) 202, a receiving level calculator (LV_R) 203, a sending level calculator (LV_S) 204, a sending voice activity detector (VAD_S) 205, a level corrector 206, a level variation detector 207, and a gain calculator 208. All of these elements may be hardware elements. Alternatively, the sound signal adjustment apparatus 20 may be implemented on a general-purpose computing device having a central processing unit (CPU), read-only memory (ROM), random access memory (RAM), electrically programmable erasable read-only memory (EEPROM or flash memory), and other well-known facilities, by installing a volume control program in the computing device: for example, by storing the volume control program in the ROM or flash memory. In this case the elements of the sound signal adjustment apparatus 20 shown in FIG. 1 are software elements corresponding to parts of the volume control program. As another alternative, some of the elements of the sound signal adjustment apparatus 20 may be hardware elements and some may be software elements.

The receiving voice activity detector 202 detects voice activity in the far end signal. The sending voice activity detector 205 detects voice activity in the near end signal.

Although the speaker 11 operates principally as an electric-to-acoustic transducer, it also operates as an acoustic-to-electric transducer similar, but inferior in performance, to the microphone 14. If, for example, the speaker 11 converts the electrical signal received from the DAC 12 to sound by vibrating a diaphragm, external sound such as ambient noise from the background noise source 40 also vibrates the diaphragm and is converted back to an electrical signal, which is supplied to ADC 201. The ADC 201 converts this electrical signal to a digital signal, which it supplies to the receiving level calculator 203.

The receiving voice activity detector 202 detects voice activity in the amplified far end signal received from the amplifier 13. Known methods of detecting voice activity in the far end signal, used in existing telephone apparatus, may be employed. When no voice activity is detected in the far end signal, the receiving voice activity detector 202 activates an NV_R (no voice received) signal. When voice activity is detected in the far end signal, the receiving voice activity detector 202 inactivates the NV_R signal. When the NV_R signal is active, since no voice activity is detected in the far end signal, only ambient noise from the background noise source 40 is converted to an analog electrical signal by the speaker 11, converted to a digital signal by ADC 201, and supplied to the LV_R 203.

The sending voice activity detector 205 detects voice activity in the near end signal received from ADC 15 by, for example, the same method as used in the receiving voice activity detector 202. When no voice activity is detected in the near end signal, the sending voice activity detector 205 activates an NV_S (no voice sent) signal. When voice activity is detected in the near end signal, the sending voice activity detector 205 inactivates the NV_S signal.

An exemplary method of detecting voice activity in the far end signal will now be described. In the description below, the far end signal x(n) received by the amplifier 13 is a digital discrete-time signal. The letter n indicates sample number. The amplifier 13 is a digital device such as a multiplier.

The receiving voice activity detector 202 detects voice activity in the far end signal by taking the difference between a long-term average ABS_L(n) and a short-term average ABS_S(n) of the signal level. The long-term average ABS_L(n) of the signal level may calculated as in equation (1) below and the short-term average ABS_S(n) of the signal level as in equation (2) below, for example; voice activity can then be detected from the calculated results. In the description below, $\delta 1$ in equation (1) has the value 0.0001 ($\delta 1 = 0.0001$) and $\delta 2$ in equation (2) has the value 0.01 ($\delta 2 = 0.01$). The expression |x(n)| in equations (1) and (2) indicates the absolute value of the x(n). The square of x(n) may be used instead of the absolute value.

$$ABS\_L(n) = (1.0 - \delta 1) ABS\_L(n-1) + \delta 1 |x(n)| \quad (1)$$

$$ABS\_S(n) = (1.0 - \delta 2) ABS\_S(n-1) + \delta 2 |x(n)| \quad (2)$$

The parameters $\delta 1$ and $\delta 2$ in equations (1) and (2) satisfy the following conditions: $\delta 1$ is less than $\delta 2$ ($\delta 1 < \delta 2$); $\delta 1$ is between zero and one ($0 < \delta 1 < 1.0$); and $\delta 2$ is between zero and one ($0 < \delta 2 < 1.0$). If $\delta 1$ and $\delta 2$ have comparatively large values, the calculated results track rapid signal variations but are susceptible to noise. If $\delta 1$ and $\delta 2$ have comparatively small values, the calculated results track only comparatively slow signal variations but are less susceptible to noise.

Voice activity is detected when the following condition (3) is satisfied, where TH_VAD is a threshold value such as six decibels (6 dB).

$$ABS\_S(n) \geq ABS\_L(n) + TH\_VAD \quad (3)$$

The sending voice activity detector 205 can use this method to detect voice activity in the near end signal by substituting the output from ADC 15 for x(n) in equations (1) and (2) above.

When the NV_R signal from the receiving voice activity detector 202 is active, indicating that voice activity is not detected in the far end signal, the receiving level calculator 203 calculates the level NLVL_R of the signal received from the speaker 11 through ADC 201, and supplies NLVL_R to the level corrector 206.

When the signal NV_S from the sending voice activity detector 205 is active, indicating that voice activity is not detected in the near end signal, the sending level calculator 204 calculates the level NLVL_S of the signal received from the microphone 14 through ADC 15, and supplies NLVL_S to the level corrector 206.

Because the level corrector 206 receives level NLVL_R from the receiving level calculator 203 and level NLVL_S from the sending level calculator 204 only when there is no detected voice activity, both levels NLVL_R and NLVL_S represent only ambient noise. Because the speaker 11 and microphone 14 are separated by only a short distance, they both pick up the same ambient noise from the background noise source 40. Because the speaker 11 is inferior to the microphone 14 in sound capturing performance, the level corrector 206 adjusts NLVL_R to compensate for the difference in sound capturing performance, generates a compensated level NLVL_R_r, and supplies the compensated level NLVL_R_r together with NLVL_S to the level variation detector 207.

Figure 2C:
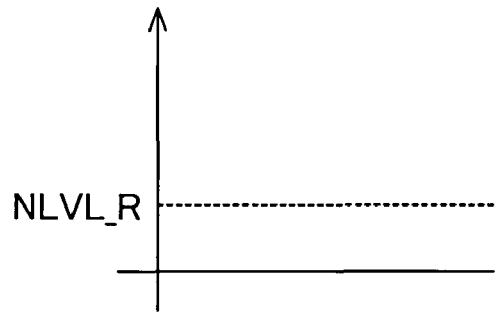
FIG. 2C is a graph illustrating a compensation operation performed on the level of the external sound signal.
Figure 2C:
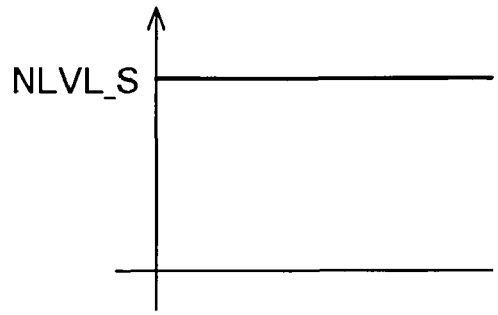
Figure 2C:
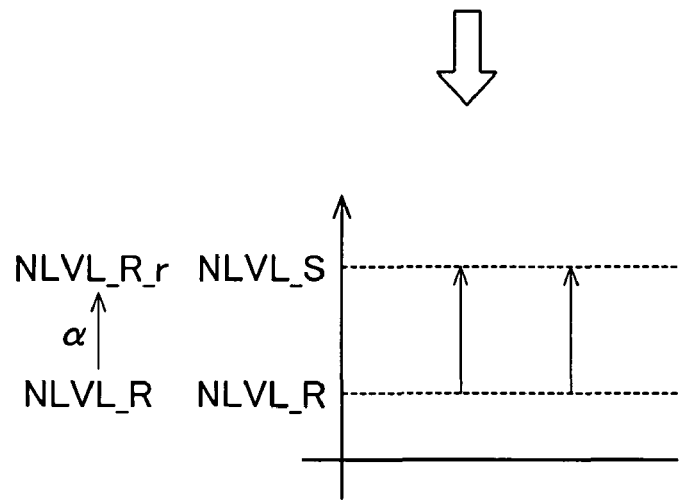

An exemplary compensation operation performed in the level corrector 206 is illustrated in FIGS. 2A to 2C.

The uncompensated NLVL_R level at the start of a call, before either party has begun to speak, is shown in FIG. 2A. The NLVL_S level during the same initial period is shown in FIG. 2B.

As indicated in FIG. 2C, the level corrector 206 compensates the NLVL_R level by multiplying the NLVL_R in FIG. 2A by a factor α that makes the compensated level NLVL_R_r identical to the NLVL_S level in FIG. 2B. The level corrector 206 calculates the factor α by dividing the NLVL_S level by the NLVL_R level. After calculating the factor α in this way, the level corrector 206 continues to use the same factor α in compensating subsequent NLVL_R values to produce the compensated level NLVL_R_r supplied to the level variation detector 207.

Other possible ways of calculating the factor α are also contemplated. For example, instead of being calculated at the start of a call, the factor α may be calculated during an initialization procedure when the telephone is manufactured or purchased, or may be preset in the level corrector 206 on the basis of the known sound capturing performance of the speaker 11 and microphone 14, as determined experimentally when the telephone is designed or developed.

Figure 3:
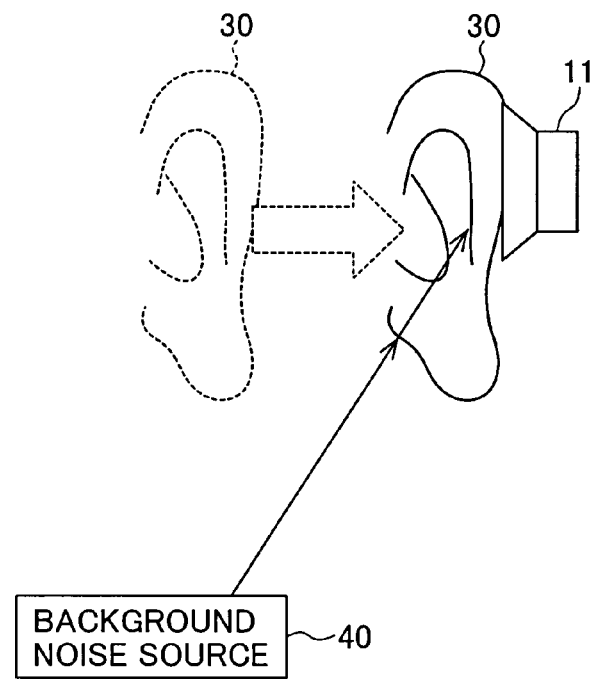
FIG. 3 illustrates the blocking of external sound.

The level variation detector 207 detects blocked and unblocked levels of the compensated external sound signal and corresponding levels of the near end signal. The blocking of external sound by the ear and the operation of the level variation detector 207 are illustrated in FIG. 3. When the far end party (not shown) is speaking in a small voice that is hard to hear, the near end party often brings the speaker 11 near to his or her ear 30 and holds the speaker 11 against the ear in order to hear the far end party's voice better. When the ear 30 is very close to the speaker 11, the ear 30 blocks external sound from reaching and being captured by the speaker 11.

Because of the small size of today's portable telephones, the part including the speaker 11 is rarely if ever designed to be held tightly to the ear 30. Even when the part including the speaker 11 is held close to the ear 30, it does not create the type of enclosed space contemplated in JP H07-038624. When the ear 30 approaches the speaker 11, however, even if the part including the speaker 11 is not pressed tightly against the ear 30, the ear 30 prevents part of the ambient noise from reaching the speaker 11, as shown in FIG. 3. The compensated level NLVL_R_r (generated from NLVL_R) of the external sound signal then falls corresponding to the degree to which external sound is blocked by the ear 30.

Figure 4A:
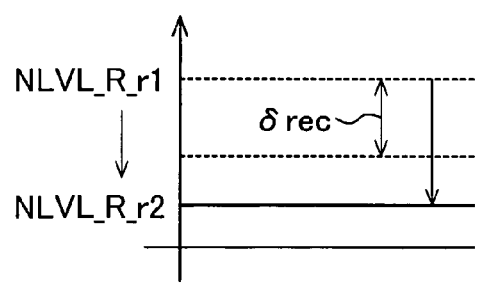
FIG. 4A is a graph illustrating blocked and unblocked levels of the compensated external sound signal.
Figure 4B:
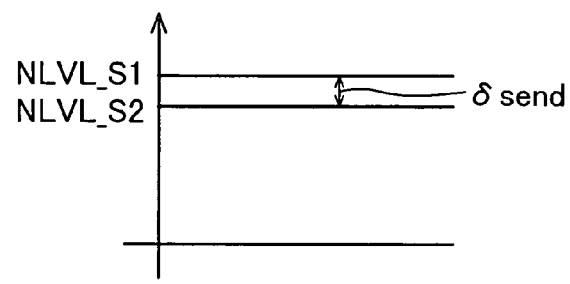
FIG. 4B is a graph illustrating corresponding levels of the near end signal.

The unblocked level NLVL_R_r1 of external sound captured by the speaker 11 and the corresponding blocked level NLVL_R_r2 detected when the speaker 11 is moved close to the ear are shown in FIG. 4A. The corresponding levels NLVL_S1 and NLVL_S2 of the sending signal captured by the microphone 14 are shown in FIG. 4B. The unblocked level NLVL_R_r1 and the corresponding sending level NLVL_S1 are obtained simultaneously at an arbitrary timing. The blocked level NLVL_R_r2 and the corresponding sending level NLVL_S2 are obtained simultaneously at a subsequent timing.

When the external sound is blocked by the ear, the compensated external sound level NLVL_R_r received by the level variation detector 207 falls sharply from the unblocked level NLVL_R_r1 to the blocked level NLVL_R_r2 shown in FIG. 4A. The sending level NLVL_S1 does not fall sharply; it falls only slightly to the level NLVL_S2 shown in FIG. 4B. The reason is that in a telephone conversation, although the near end party's face may approach the microphone 14, it is rarely pressed directly against the microphone 14. Accordingly, even when external sound is blocked from reaching the speaker 11, the external sound is not blocked from reaching the microphone 14.

A sharp fall in the amount of external sound reaching the speaker 11 is detected when the amount of external sound reaching the speaker 11 drops by more than a threshold value δrec such as 6 dB. That is, a sharp fall is detected when the levels NLVL_R_r1 and NLVL_R_r2 satisfy the following condition (4).

$$NLVL\_R\_r2 < NLVL\_R\_r1 - \delta rec \quad (4)$$

In one exemplary method of detecting sharp falls in the NLVL_R level, the maximum NLVL_R level since the start of a call is taken as NLVL_R_r1 and the minimum NLVL_R level since the start of the call is taken as NLVL_R_r2. If NLVL_R_r1 and NLVL_R_r2 satisfy condition (4), a sharp fall is detected at the timing at which NLVL_R_r2 is obtained. In another exemplary method, the NLVL_R_r level is sampled at predetermined intervals, and a sharp fall is detected when the current sample NLVL_R_r2 and the preceding sample NLVL_R_r1 satisfy condition (4).

Sharp falls in the sending level NLVL_S are detected when the following condition (5) is satisfied, where send is a threshold value such as 3 dB.

$$NLVL\_S2 < NLVL\_S1 - \delta send \quad (5)$$

A sharp fall in the level of sound captured by the microphone 14 while the near end party is not talking may indicate that the telephone 10 has been placed upside down on a desk or that the microphone 14 has been covered by the user's hand. Alternatively, the amount of ambient noise produced by the background noise source 40 may have fallen sharply. In either case, there is no need for extra amplification of the received far end signal. Accordingly, the level variation detector 207 produces a sharp fall detection signal sh only when condition (4) is satisfied and condition (5) is not satisfied, and inactivates the sharp fall detection signal sh whenever condition (5) is satisfied, even if condition (4) is also satisfied. The sharp fall detection signal sh is sent to the gain calculator 208.

When the sharp fall detection signal sh is active, the gain calculator 208 sets the amplifier 13 to operate with a gain of, for example, 12 dB. The amplifier 13 amplifies the far end signal x(n) by 12 dB and supplies the amplified far end signal to the speaker 11.

In the initial state, the amplifier 13 operates with unity gain (1.0, equivalent to 0 dB), and the amplifier 13 neither amplifies nor attenuates the far end signal. This gain value (0 dB) and the above value of 12 dB are design choices; other values may be used.

The volume control operation of the sound signal adjustment apparatus 20 (sound signal adjustment method) will now be described with reference again to FIG. 1.

When the NV_R signal from the receiving voice activity detector 202 is active, indicating that voice activity is not detected in the far end signal, the receiving level calculator 203 calculates the level NLVL_R of the signal received from the speaker 11 through ADC 201, and supplies NLVL_R to the level corrector 206.

When the NV_S signal from the sending voice activity detector 205 is active, indicating that voice activity is not detected in the near end signal, the sending level calculator 204 calculates the level NLVL_S of the signal received from the microphone 14 through ADC 15, and supplies NLVL_S to the level corrector 206.

When the level corrector 206 receives NLVL_R from the receiving level calculator 203 and NLVL_S from the sending level calculator 204, it adjusts NLVL_R, generates a compensated level NLVL_R_r, and supplies the compensated level NLVL_R_r together with NLVL_S to the level variation detector 207.

When condition (4) is satisfied and condition (5) is not satisfied, the level variation detector 207 decides that external sound is being blocked from reaching the speaker 11 by the user's ear 30 and activates the sharp fall detection signal sh.

When the sh signal is active, the gain calculator 208 sets the amplifier 13 to amplify the far end signal x(n) with a higher gain than when the sh signal is inactive.

The first embodiment has the following effects.

The speaker 11 of the telephone is used as an acoustic-to-electric transducer. The levels NLVL_R of the sound reaching the speaker 11 (when NV_R is active) and NLVL_S of the sound reaching the microphone 14 (when NV_S is active) are obtained. When the ear 30 blocks ambient sound from reaching the speaker 11, as indicated by a sharp fall in the NLVL_R level but not in the NLVL_S level, the gain calculator 208 increases the gain of the amplifier 13 and the volume of the sound reproduced by the speaker 11 is increased. Accordingly, regardless of the level of ambient noise, when the near end party presses the part of the telephone including the speaker 11 against his or her ear 30 in order to hear the far end party's voice better, the telephone cooperates by increasing the volume of the reproduced sound, instead of decreasing the volume as in JP H07-038624. This adjustment does not require an additional sound pressure sensor, so it does not add to the cost of the telephone. Since the user of the telephone does not have to speak in a loud voice, people nearby are not disturbed. The telephone user can therefore increase the speaker volume whenever desired, even during a telephone conversation in a public place, without having to manipulate manual controls.

Second Embodiment

Figure 5:
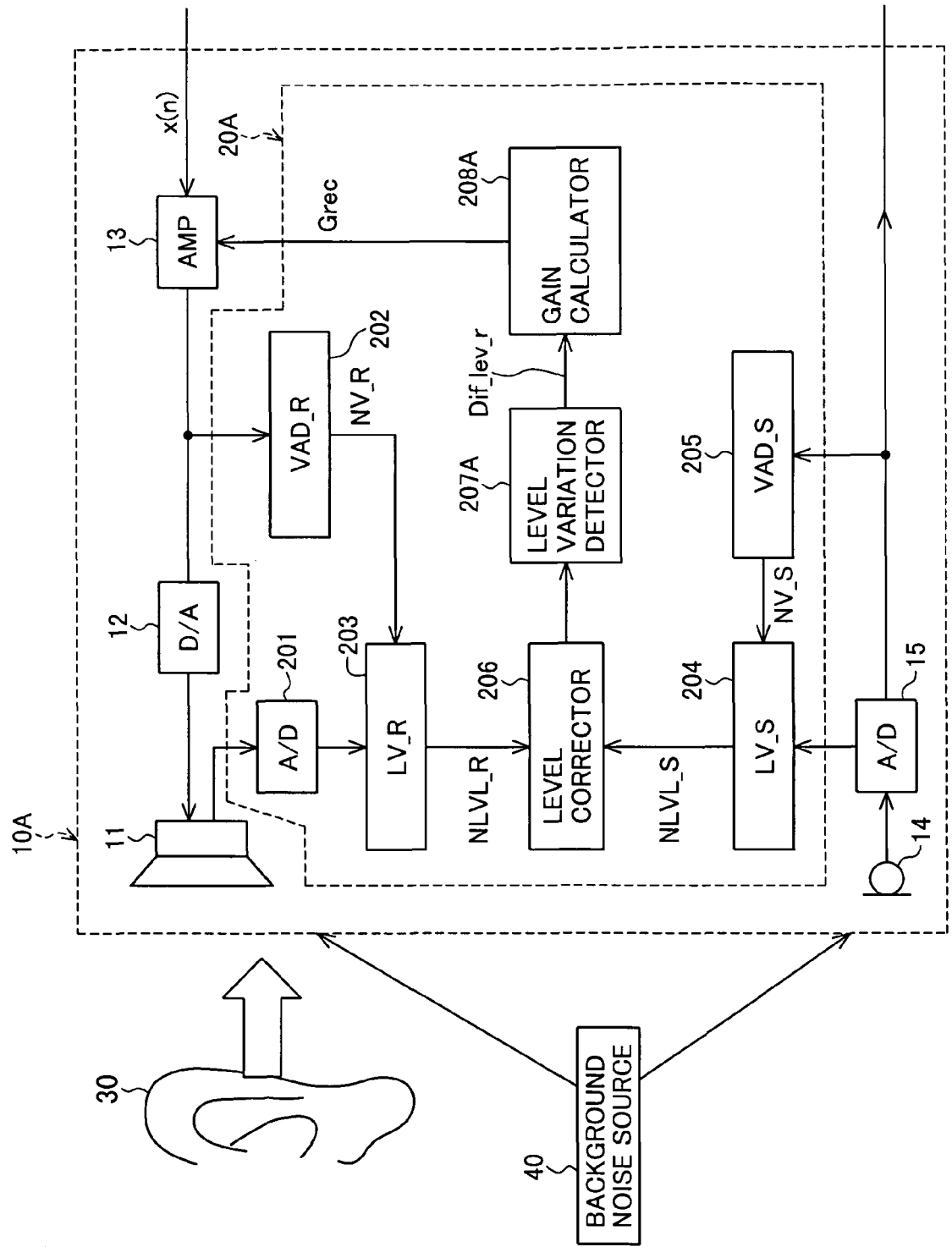
FIG. 5 is a block diagram of a sound signal adjustment apparatus according to a second embodiment of the invention.

Referring to the block diagram in FIG. 5, the telephone 10A in the second embodiment differs from the first embodiment by including a modified sound signal adjustment apparatus 20A having a modified level variation detector 207A and a modified gain calculator 208A.

When condition (4) is true and condition (5) is false, differing from the level variation detector 207 in the first embodiment, the level variation detector 207A calculates a quantity Dif_lev_r by the following equation (6), and supplies the value of Dif_lev_r, instead of the detection signal sh, to the gain calculator 208A.

$$Dif\_lev\_r = NLVL\_R\_r2 - NLVL\_R\_r1 \quad (6)$$

The gain calculator 208A multiplies the value of Dif_lev_r by a parameter δ20 as in the following equation (7) to calculate a gain value (Grec) for the amplifier 13.

$$Grec = \delta 20 \times Dif\_lev\_r \quad (7)$$

The parameter δ20 in equation (7) may have the value 2.0 (δ20=2.0). The amplifier 13 amplifies the far end signal x(n) by the gain calculated in the gain calculator 208A, and supplies the amplified far end signal to the speaker 11 through the DAC 12.

An exemplary method of calculating the gain in the gain calculator 208A by using equation (7) has been described above, but other methods of deriving the gain from the Dif_lev_r value are also possible. For example, the gain may be calculated by using a mathematical formula other than the equation above, or obtained by referring to a lookup table of gain values that have been determined empirically from experiments or selected on the basis of experience.

The second embodiment operates in the same way as the first embodiment except that when the user's ear 30 blocks sound from reaching the speaker 11, the level variation detector 207A calculates the quantity Dif_lev_r and the gain calculator 208A sets the gain of the amplifier 13 according to the value of Dif_lev_r. When the user's ear 30 is not blocking sound from reaching the speaker 11, that is, when condition (4) is false or condition (5) is true, the value of Dif_lev_r is zero decibels (Dif_lev_r=0) as in the first embodiment.

The second embodiment has the same effects as the first embodiment except that when the user's ear 30 blocks sound from reaching the speaker 11, the gain of the amplifier 13 is set to a value that varies according to the degree to which ambient noise is blocked by the ear 30. Accordingly, the near end party can adjust the speaker volume to any desired level by adjusting the distance from the speaker 11 to the ear 30, or the pressure of the telephone against the ear 30. As in the first embodiment, when the near end party brings the part of the telephone including the speaker 11 closer to the ear 30 in order to hear the far end party's voice better, the telephone cooperates by increasing the volume of the reproduced sound.

Third Embodiment

Figure 6:
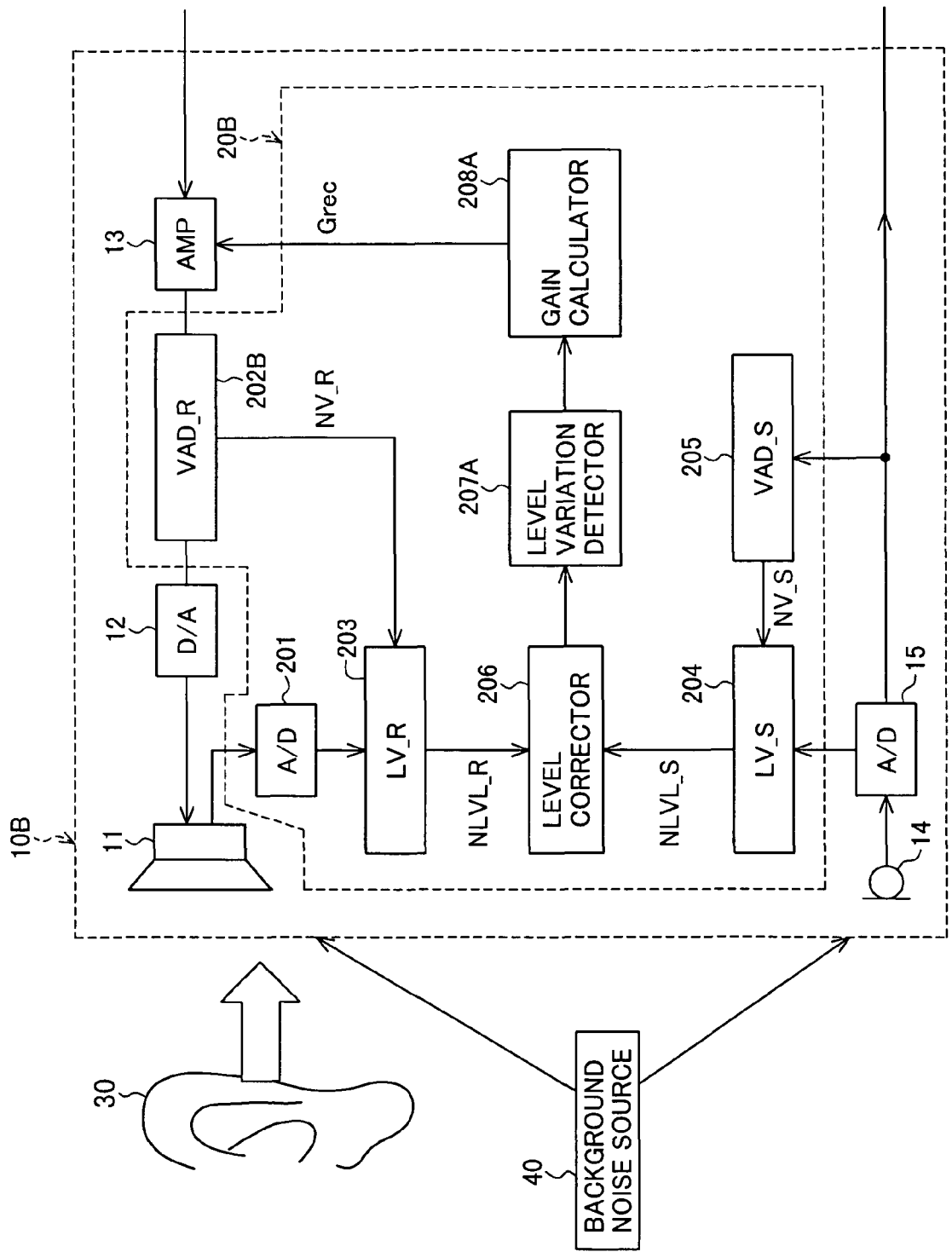
FIG. 6 is a block diagram of a sound signal adjustment apparatus according to a third embodiment.

Referring to the block diagram in FIG. 6, the telephone 10B in the third embodiment differs from the second embodiment by including a modified sound signal adjustment apparatus 20B having a modified receiving voice activity detector 202B inserted between the DAC 12 and the amplifier 13.

The modified receiving voice activity detector 202B in the third embodiment detects voice activity in the far end signal in the same way as in the first and second embodiments. The difference between the third embodiment and the first and second embodiments is that when voice activity is detected in the far end signal received from the amplifier 13, the receiving voice activity detector 202B supplies the far end signal to the DAC 12, but when no voice activity is detected in the far end signal, the receiving voice activity detector 202B stops supplying the far end signal to the DAC 12.

Although the sound signal adjustment apparatus 20B shown in FIG. 6 is a modification of the sound signal adjustment apparatus 20A in FIG. 5 in the second embodiment, the same modification can be made to the sound signal adjustment apparatus 20 in the first embodiment, by replacing the receiving voice activity detector 202 in FIG. 1 with the receiving voice activity detector 202B in FIG. 6.

The third embodiment operates in the same way as the first or second embodiment except that when no voice activity is detected in the far end signal, the speaker 11 stops reproducing the far end signal.

The third embodiment provides the same effects as the first or second embodiment but provides them with greater accuracy.

In the first and second embodiments, any noise included in the far end signal is reproduced by the speaker 11 and superimposed as an echo on the noise picked up from the background noise source 40. The noise level NLVL_R detected by the receiving level calculator 203 therefore includes both near end and far end noise. If there is much far end noise, the gain calculator will respond to changes in both the near end and far end noise levels, and far end noise may have unwanted effects on the gain of the amplifier 13.

In the third embodiment, the speaker 11 reproduces far end voice only when far end voice activity is detected, during which periods the receiving voice activity detector 202B inactivates the NV_R signal and the receiving level calculator 203 does not operate. When the receiving voice activity detector 202B inactivates the NV_R signal to allow the receiving level calculator 203 to operate, it also ceases to supply the far end signal to the DAC 12, so the speaker 11 picks up only near end sound and the gain calculator operates only according to the local ambient noise level, as desired.

Fourth Embodiment

Figure 7:
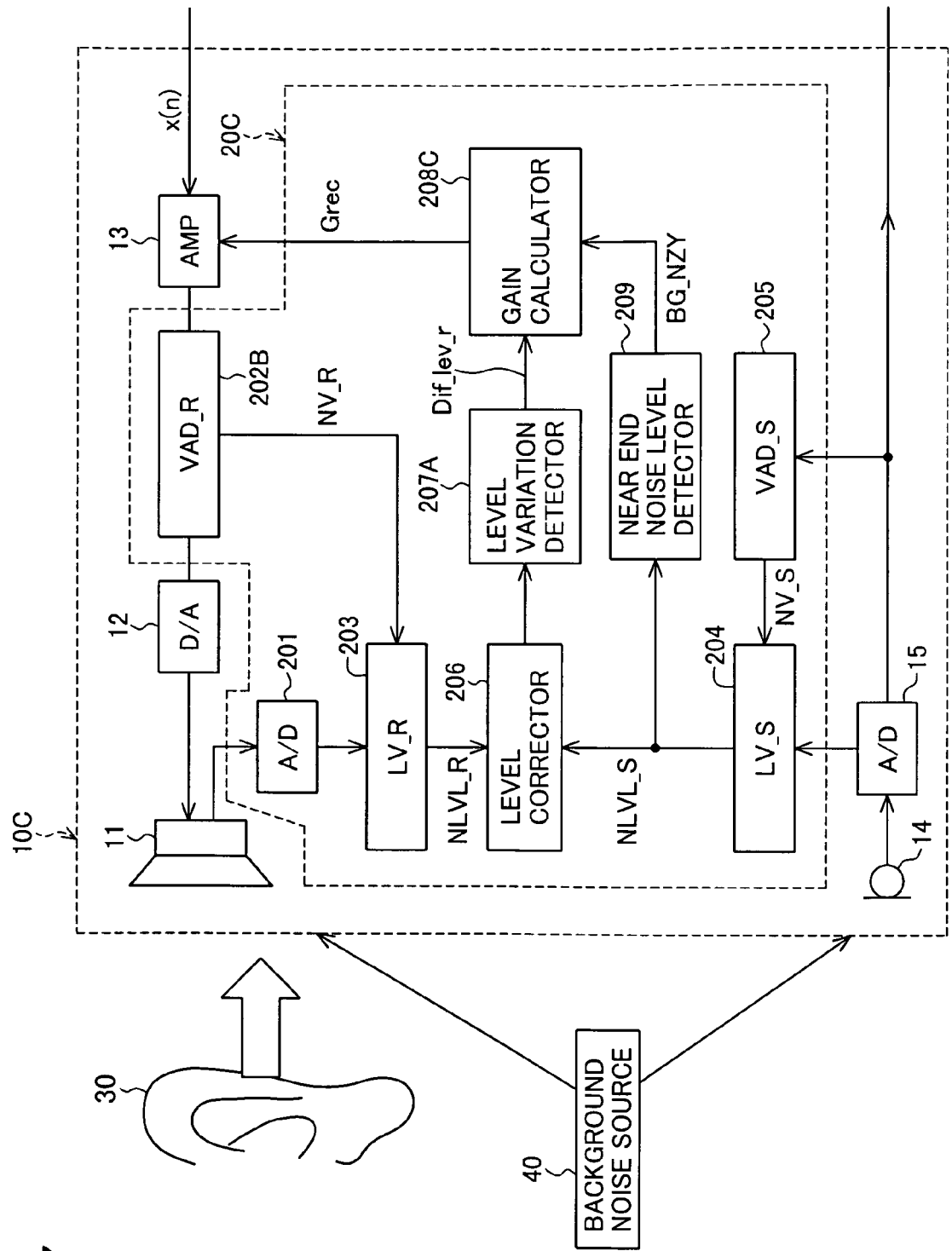
FIG. 7 is a block diagram of a sound signal adjustment apparatus according to a fourth embodiment.

Referring to the block diagram in FIG. 7, the telephone 10C in the fourth embodiment differs from the third embodiment by including a modified sound signal adjustment apparatus 20C having a near end noise level detector 209 and a modified gain calculator 208C. The near end noise level detector 209 is connected to the sending level calculator 204 and gain calculator 208C.

When the NV_S signal from the sending voice activity detector 205 is active, indicating that voice activity is not detected in the near end signal, the sending level calculator 204 in the fourth embodiment calculates the NLVL_S level as in the first embodiment. When the NLVL_S level is equal to or greater than a predetermined threshold value TH_BG_S so that the following condition (8) is true, the near end noise level detector 209 activates a noise level signal, more specifically a noisy background detection signal BG_NZY, and supplies BG_NZY to the gain calculator 208C. When the condition (8) is false, the near end noise level detector 209 inactivates the BG_NZY signal.

$$NLVL\_S \geq TH\_BG\_S \quad (8)$$

The threshold value TH_BG_S may be set to a digital amplitude value of −30 dBm0, which is referenced to the amplitude of a one kilohertz (1-kHz) tone defined as 0 dBm0 by Recommendation G.711 (Pulse Code Modulation (PCM) of Voice Frequencies) of the Telecommunication Standardization Sector of the International Telecommunication Union (ITU-T).

The gain calculator 208C receives the value of Dif_lev_r from the level variation detector 207A as in the second embodiment. When the BG_NZY signal is active, the gain calculator 208C calculates a gain value (Grec) for the amplifier 13 by the following equation (9). When the BG_NZY signal is inactive, the gain calculator 208C calculates a gain value (Grec) for the amplifier 13 by equation (10). The parameters δ40 and δ41 in equations (9) and (10) satisfy an inequality condition (11).

$$Grec = \delta 40 \times Dif\_lev\_r \quad (9)$$

$$Grec = \delta 41 \times Dif\_lev\_r \quad (10)$$

$$\delta 40 \geq \delta 41 \quad (11)$$

The parameter δ40 in equation (9) may have the value 4.0 (δ40=4.0) and δ41 in equation (10) may have the value 2.0 (δ41=2.0). The amplifier 13 amplifies the far end signal x(n) by the gain calculated in the gain calculator 208C, and supplies the amplified far end signal to the speaker 11 through the receiving voice activity detector 202B and the DAC 12.

An exemplary method of calculating the gain in the gain calculator 208C by using equations (9) and (10) has been described above, but other methods of deriving the gain from the Dif_lev_r value are also possible. As long as the gain when the detection signal BG_NZY is active exceeds the gain when the detection signal BG_NZY is inactive, the gain may be calculated by using a mathematical formula other than the equations above, or obtained by referring to a lookup table of gain values that have been determined experimentally or selected on the basis of experience. Alternately, equations (9) and (10) may be used but the value of δ40 in equation (9) may be adjusted according to the value of the NLVL_S signal.

The gain calculated by the gain calculator 208C may be applied to an analog amplifier inserted between the DAC 12 and the speaker 11, and the far end signal may be amplified in analog form instead of being amplified in digital form by amplifier 13.

The fourth embodiment operates in the same way as the third embodiment except that the near end noise level detector 209 activates the BG_NZY signal when condition (8) is true, and the gain calculator 208C calculates the gain (Grec) for the amplifier 13 from the Dif_lev_r value received from the level variation detector 207A by using equation (9) when the BG_NZY signal is active and equation (10) when the BG_NZY signal is inactive.

The fourth embodiment has the same effects as the first to third embodiments except that the near end noise level detector 209 detects the ambient noise level, and boosts the gain of the amplifier 13 when the ambient noise level exceeds a predetermined threshold level. Accordingly, when the reproduced sound is hard to hear because of a high level of ambient noise, the amplifier 13 amplifies the far end signal to, for example, approximately its full rated output power, making the reproduced sound easier to hear.

Fifth Embodiment

Figure 8:
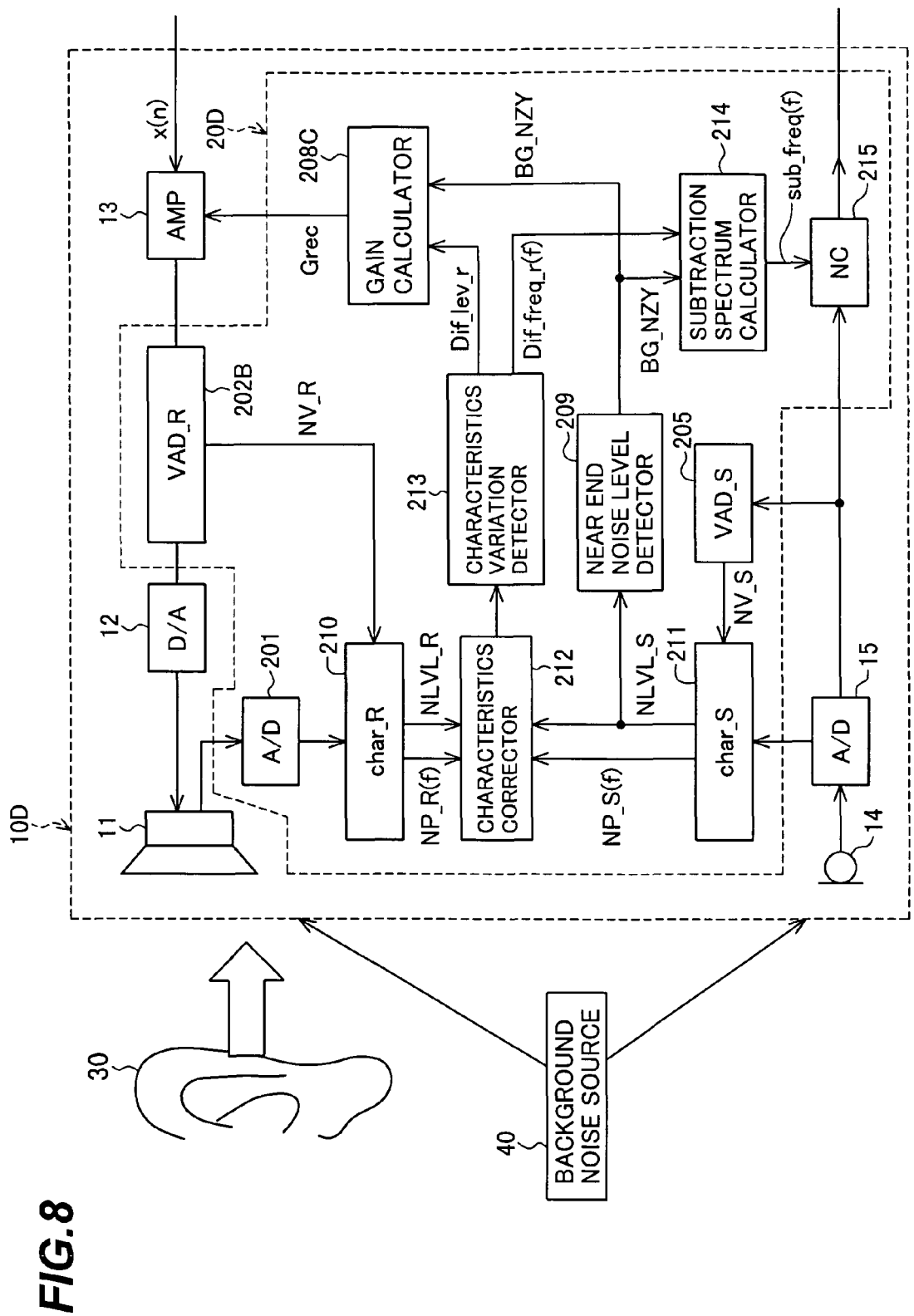
FIG. 8 is a block diagram of a sound signal adjustment apparatus according to a fifth embodiment.

Referring to the block diagram in FIG. 8, the telephone 10D in the fifth embodiment differs from the fourth embodiment in that its sound signal adjustment apparatus 20D includes a received signal characteristics calculator 210, a sending signal characteristics calculator 211, a characteristics corrector 212, and a characteristics variation detector 213 instead of the receiving level calculator 203, sending level calculator 204, level corrector 206, and level variation detector 207A in FIG. 7. The sound signal adjustment apparatus 20D also includes a subtraction spectrum calculator 214 that receives outputs from the characteristics variation detector 213 and near end noise level detector 209, and a spectral subtraction unit or noise canceler (NC) 215 that receives the output of the subtraction spectrum calculator 214. The subtraction spectrum calculator 214 and the spectral subtraction unit 215 operate as a noise reducer.

The received signal characteristics calculator 210 calculates the level NLVL_R as did the receiving level calculator 203 in the first to fourth embodiments, also calculates the frequency spectrum NP_R(f) of the external sound signal received from the speaker 11 through ADC 201 by, for example, the well-known fast Fourier transform (FFT), and supplies the level NLVL_R and frequency spectrum NP_R(f) to the characteristics corrector 212. The sending signal characteristics calculator 211 calculates the level NLVL_S as did the sending level calculator 204 in the first to fourth embodiments, also calculates the frequency spectrum NP_S(f) of the signal received from the microphone 14 through ADC 15, and supplies the level NLVL_S and the frequency spectrum NP_S (f) to the characteristics corrector 212.

Because the speaker 11 is inferior to the microphone 14 in sound capturing performance, the characteristics corrector 212 adjusts the NLVL_R level received from the received signal characteristics calculator 210 to compensate for the difference between the NLVL_R and NLVL_S levels due to the difference in sound capturing performance, generates a compensated level NLVL_R_r, and supplies the compensated level NLVL_R_r together with NLVL_S to the characteristics variation detector 213, as did the level corrector 206 in the first to fourth embodiments. In addition, the characteristics corrector 212 makes a similar adjustment to the frequency spectrum NP_R(f) received from the received signal characteristics calculator 210 to compensate for the difference between the NP_R(f) and NP_S(f) frequency spectra due to the difference in sound capturing performance, generates a compensated frequency spectrum NP_R_r(f), and supplies the compensated frequency spectrum NP_R_r(f) together with NP_S(f) to the characteristics variation detector 213.

Figure 9A:
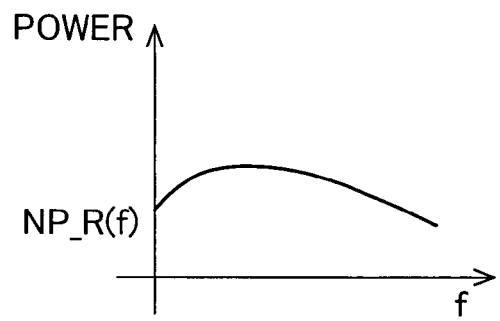
FIG. 9A is a graph illustrating the uncompensated frequency spectrum of the external sound signal.
Figure 9B:
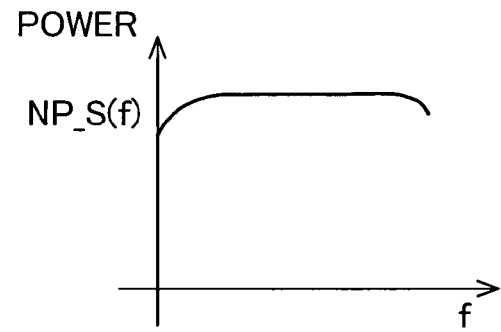
FIG. 9B is a graph illustrating the uncompensated frequency spectrum of the near end signal.
Figure 9C:
FIG. 9C is a graph illustrating a compensation operation performed on the frequency spectrum of the external sound signal.
Figure 9C:
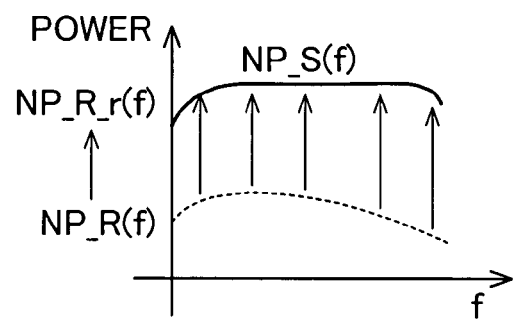

An exemplary compensation operation performed in the characteristics corrector 212 is illustrated in FIGS. 9A to 9C, in which the horizontal axes indicate frequency (f). The uncompensated NP_R(f) frequency spectrum calculated by the FFT at the start of a call, before either party has begun to speak, is shown in FIG. 9A. The NP_S(f) frequency spectrum calculated by the FFT during the same initial period is shown in FIG. 9B.

As indicated in FIG. 9C, the characteristics corrector 212 compensates the NP_R(f) frequency spectrum by multiplying the power value NP_R(f) of each frequency f by a factor that gives a result NP_R_r(f) equal to the corresponding NP_S(f) value in FIG. 9B. This factor is calculated by dividing the NP_S(f) value by the NP_R(f) value. After calculating the factor NP_S(f)/NP_R(f) in this way, the characteristics corrector 212 continues to use the same factor NP_S(f)/NP_R(f) in compensating subsequent NP_R(f) values for the same frequency f to produce the compensated NP_R_r(f) value supplied to the characteristics variation detector 213.

Alternatively, the characteristics corrector 212 may compensate the NP_S(f) frequency spectrum by multiplying each NP_S(f) value in FIG. 9B by the inverse factor NP_R(f)/NP_S(f) to obtain a result equal to the corresponding NP_R(f) value in FIG. 9A.

Other possible ways of calculating the factor NP_S(f)/NP_R(f) or NP_R(f)/NP_S(f) are also contemplated. For example, instead of being calculated at the start of a call, this factor may be calculated during an initialization procedure when the telephone is manufactured or purchased, or may be preset in the characteristics corrector 212 on the basis of the known sound capturing performance of the speaker 11 and microphone 14, as determined experimentally when the telephone is designed or developed.

The characteristics variation detector 213 calculates the same quantity Dif_lev_r as calculated by the level variation detector 207A in the second embodiment, indicating the change in signal level caused by the blocking of ambient noise by the user's ear, and also calculates the frequency characteristic of this sound blocking effect. That is, the characteristics variation detector 213 calculates a difference spectrum indicating the change in the power level of each frequency component in the ambient noise spectrum due to the blocking effect of the user's ear.

Figure 10A:
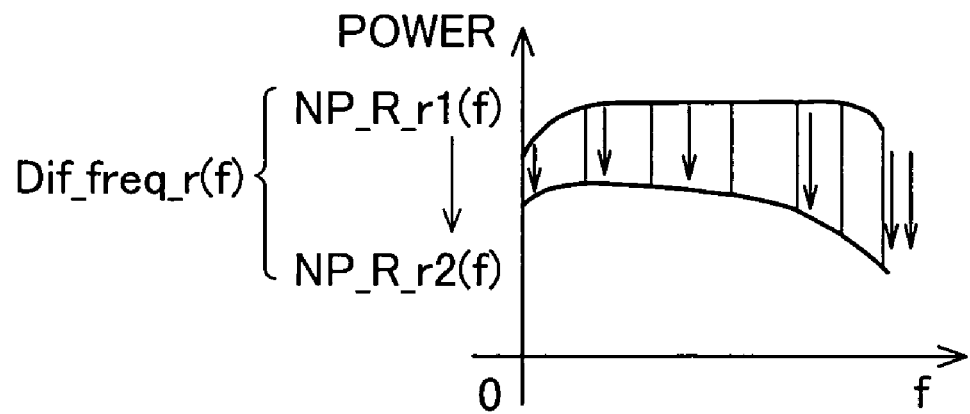
FIG. 10A is a graph illustrating compensated frequency spectra of blocked and unblocked external sound signals.
Figure 10B:
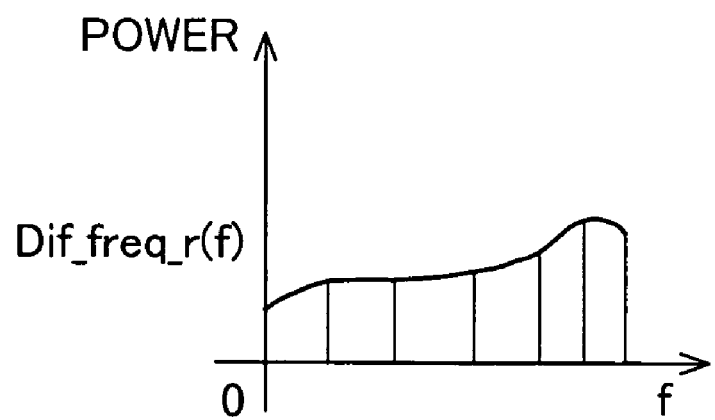
FIG. 10B is a graph illustrating a difference spectrum.

Examples of the compensated frequency spectrum NP_R_r1($f$) when the speaker 11 is distant from the user's ear and the compensated frequency spectrum NP_R_r2($f$) when the speaker 11 is moved close to the ear are shown in FIG. 10A. The difference spectrum Dif_freq_r(f) calculated in the characteristics variation detector 213 is shown in FIG. 10B.

When the speaker 11 is moved close to the user's ear and ambient noise is blocked, the compensated spectrum NP_R_r1($f$) falls to the compensated spectrum NP_R_r2($f$) as shown in FIG. 10A. The characteristics variation detector 213 calculates the difference spectrum Dif_freq_r(f) representing the differences between the compensated NP_R_r1($f$) and NP_R_r2($f$) spectra shown in FIG. 10B by the following equation (12). Alternatively, since each compensated NP_R_r1($f$) value is equal to the corresponding NP_S(f) value, denoted NP_S1($f$), equation (12-1) may be used instead of equation (12).

$$Dif\_freq\_r(f)=NP\_R\_r1(f)-NP\_R\_r2(f) \qquad (12)$$

$$Dif\_freq\_r(f)=NP\_S1(f)-NP\_R\_r2(f) \qquad (12\text{-}1)$$

The difference spectrum Dif_freq_r(f) calculated in the characteristics variation detector 213 is supplied to the subtraction spectrum calculator 214. The quantity Dif_lev_r is supplied to the gain calculator 208C. The gain calculator 208C operates as in the fourth embodiment.

The near end noise level detector 209 generates the noisy background detection signal BG_NZY as in the fourth embodiment, activating BG_NZY when the NLVL_S level is equal to or greater than the predetermined threshold value TH_BG_S and inactivating BG_NZY at other times. The BG_NZY signal is supplied to the subtraction spectrum calculator 214 as well as to the gain calculator 208C.

The subtraction spectrum calculator 214 receives the difference spectrum Dif_freq_r(f) from the characteristics variation detector 213. When the BG_NZY signal is inactive, the subtraction spectrum calculator 214 calculates a noise subtraction frequency spectrum Sub_freq(f) by the following equation (13). When the BG_NZY signal is active, the subtraction spectrum calculator 214 calculates the noise subtraction frequency spectrum Sub_freq(f) by equation (14).

$$Sub\_freq(f)=C51\times Dif\_freq\_r(f) \qquad (13)$$

$$Sub\_freq(f)=C52\times Dif\_freq\_r(f) \qquad (14)$$

The parameter C51 in equation (13) may have the value 0.2 (C51=0.2) and C52 in equation (14) may have the value 0.9 (C52=0.9). The parameters C51 and C52 are both equal to or between zero and one ($1.0 \geq C51 \geq 0$, $1.0 \geq C52 \geq 0$). If C51 and C52 have comparatively large values, a comparatively large noise reduction effect is obtained but the spectral subtraction operation may also produce a distorted sound quality. If C51 and C52 have comparatively small values, a smaller noise reduction effect is obtained but the spectral subtraction operation produces less distortion. To produce a greater noise reduction effect when the detection signal BG_NZY is active, C52 is preferably greater than C51 (C52>C51).

A simple method of calculating the noise subtraction frequency spectrum Sub_freq(f) in the subtraction spectrum calculator 214 by using equations (13) and (14) has been described above, but other methods of deriving Sub_freq(f) from Dif_freq_r(f) are also contemplated. For example, the value of C51 in equation (13) may be adjusted according to the value of the NLVL_S signal, as long as the Sub_freq(f) values when the detection signal BG_NZY is active remain equal to or greater than the values when the detection signal BG_NZY is inactive.

The spectral subtraction unit 215 may use the well-known spectral subtraction method disclosed in JP 2007-116585, subtract the noise subtraction frequency spectrum Sub_freq (f) from the frequency spectrum of the near end signal including near end noise, convert the resulting frequency waveform to the time domain by performing an inverse FFT, and output the resulting near end signal to the far end party (not shown). Alternately, the spectral subtraction unit 215 may perform noise reduction by using a filter bank or an adaptive filter.

The volume control operation (sound signal adjustment method) of the sound signal adjustment apparatus 20D will now be described with reference again to FIG. 8.

When the NV_R signal from the receiving voice activity detector 202B is active, indicating that voice activity is not detected in the far end signal, the received signal characteristics calculator 210 calculates the level NLVL_R and frequency spectrum NP_R(f) of the signal received from the speaker 11 through ADC 201, and supplies NLVL_R and NP_R(f) to the characteristics corrector 212.

When the NV_S signal from the sending voice activity detector 205 is active, indicating that voice activity is not detected in the near end signal, the sending signal characteristics calculator 211 calculates the level NLVL_S and frequency spectrum NP_S(f) of the signal received from the microphone 14 through ADC 15, and supplies NLVL_S and NP_S(f) to the characteristics corrector 212.

When the characteristics corrector 212 receives these signals from the received signal characteristics calculator 210 and sending signal characteristics calculator 211, the characteristics corrector 212 adjusts NLVL_R and NP_R(f) to obtain a compensated level NLVL_R_r and a compensated frequency spectrum NP_R_r(f), and supplies the compensated level NLVL_R_r and compensated frequency spectrum NP_R_r(f) together with NLVL_S and NP_S(f) to the characteristics variation detector 213.

When condition (4) is satisfied and condition (5) is not satisfied, the characteristics variation detector 213 decides that external sound is being blocked from reaching the speaker 11 by the user's ear 30, calculates the quantity Dif_lev_r by using equation (6) and the difference spectrum Dif_freq_r(f) by using equation (12), and supplies the quantity Dif_lev_r to the gain calculator 208C and the difference spectrum Dif_freq_r(f) to the subtraction spectrum calculator 214. When condition (4) is false or condition (5) is true, the value of Dif_lev_r is zero decibels.

The near end noise level detector 209 supplies the gain calculator 208C and subtraction spectrum calculator 214 with a noisy background detection signal BG_NZY that is active while the NLVL_S level is equal to or greater than the predetermined threshold value TH_BG_S so that condition (8) is true, and inactive at other times.

The gain calculator 208C calculates the gain (Grec) for the amplifier 13 from the Dif_lev_r value received from the characteristics variation detector 213 by using equation (9) when the BG_NZY signal is active and equation (10) when the BG_NZY signal is inactive.

The subtraction spectrum calculator 214 calculates the noise subtraction frequency spectrum Sub_freq(f) by equation (13) when the BG_NZY signal is inactive and equation (14) when the BG_NZY signal is active, and supplies Sub_freq(f) to the spectral subtraction unit 215. The spectral subtraction unit 215 reduces noise in the near end signal by subtracting Sub_freq(f) from the frequency spectrum of the near end signal, and outputs the noise-reduced near end signal to the far end party.

Once the noise subtraction frequency spectrum Sub_freq(f) has been calculated by the characteristics variation detector 213 and subtraction spectrum calculator 214, it can be used without change by the spectral subtraction unit 215 for the duration of the call, or until the near end noise level detector 209 changes the value of the noisy background signal. For this reason, the noise reduction method in the fifth embodiment requires less processing than methods that require continuous feedback, such as the noise reduction method described in JP H07-202998.

The fifth embodiment has the same effects as the fourth embodiment and an additional noise reduction effect. By calculating the difference Dif_freq_r(f) between the compensated frequency spectrum NP_R_r1(*f*) when the speaker 11 is distant from the user's ear and the compensated frequency spectrum NP_R_r2(*f*) when the speaker 11 is moved close to the ear, the characteristics variation detector 213 can infer the frequency spectrum of the ambient noise produced by the background noise source 40. The subtraction spectrum calculator 214 then reduces the noise level in the near end signal by spectral subtraction. The result is that the party at the far end receives a signal with less noise, making the near end party's voice easier to hear.

The subtraction spectrum calculator 214 also takes the overall ambient noise level, as indicated by the BG_NZY signal, into consideration. When there is much ambient noise, the subtraction spectrum calculator 214 calculates the noise subtraction frequency spectrum Sub_freq(f) by multiplying the difference spectrum Dif_freq_r(f) by a relatively large parameter between zero and unity to obtain a relatively large noise reduction effect. When there is less ambient noise, the subtraction spectrum calculator 214 multiples Dif_freq_r(f) by a relatively small parameter between zero and unity, obtaining less noise reduction effect but producing less distortion in the near end signal.

A significant advantage of this noise reduction method is that it obtains an accurate ambient noise spectrum from the change in the noise spectrum due to the blocking effect of the user's ear.

The conventional spectral subtraction method disclosed in JP 2007-116585 analyzes the near end input signal to distinguish between noise intervals and voice intervals, calculates the noise spectrum during the noise intervals, and subtracts the calculated the noise spectrum from the near end signal. A persistent problem with this method is the difficulty of identifying the noise intervals accurately. Unfortunately, there seems to be no way to avoid this problem. The intervals in which noise reduction is most needed are the intervals with high ambient noise levels, but in these intervals it is practically impossible to distinguish accurately between noise and voice. A certain amount of misdetection is inevitable. These noise interval detection errors affect the subsequent processing, so that noise frequency components that should be removed are not removed, or voice frequency components that should not be removed are removed by mistake.

In contrast, the present invention does not attempt to identify noise by analyzing the near end signal, but instead obtains the noise spectrum from the change caused by moving the telephone closer to the user's ear. The frequency components removed from the near end signal therefore tend to be the same frequency components that the user is trying to shut out by bringing the telephone closer. The accuracy with which noise intervals can be identified is less important.

Although the accuracy of the sending voice activity detector in the present may decrease with increasing noise levels, even if near end voice activity goes undetected because it is masked by noise, after the compensation applied by the characteristics corrector 212, which emphasizes noise components more than voice frequency components, and the difference calculation performed by the characteristics variation detector 213, the voice frequency components are reduced to a level that has little effect on the operation of the subtraction spectrum calculator 214. The far end party therefore receives a noise-reduced signal that retains a natural near end voice quality, regardless of the ratio of the signal level of the near end party's voice to the noise level of the near end environment.

The fifth embodiment also provides an inexpensive method of noise reduction in that the noise level is detected by using the speaker 11 as an acoustic-to-electric transducer, instead of placing a separate noise detection microphone near the speaker as advocated in JP H07-202998.

Sixth Embodiment

Figure 11:
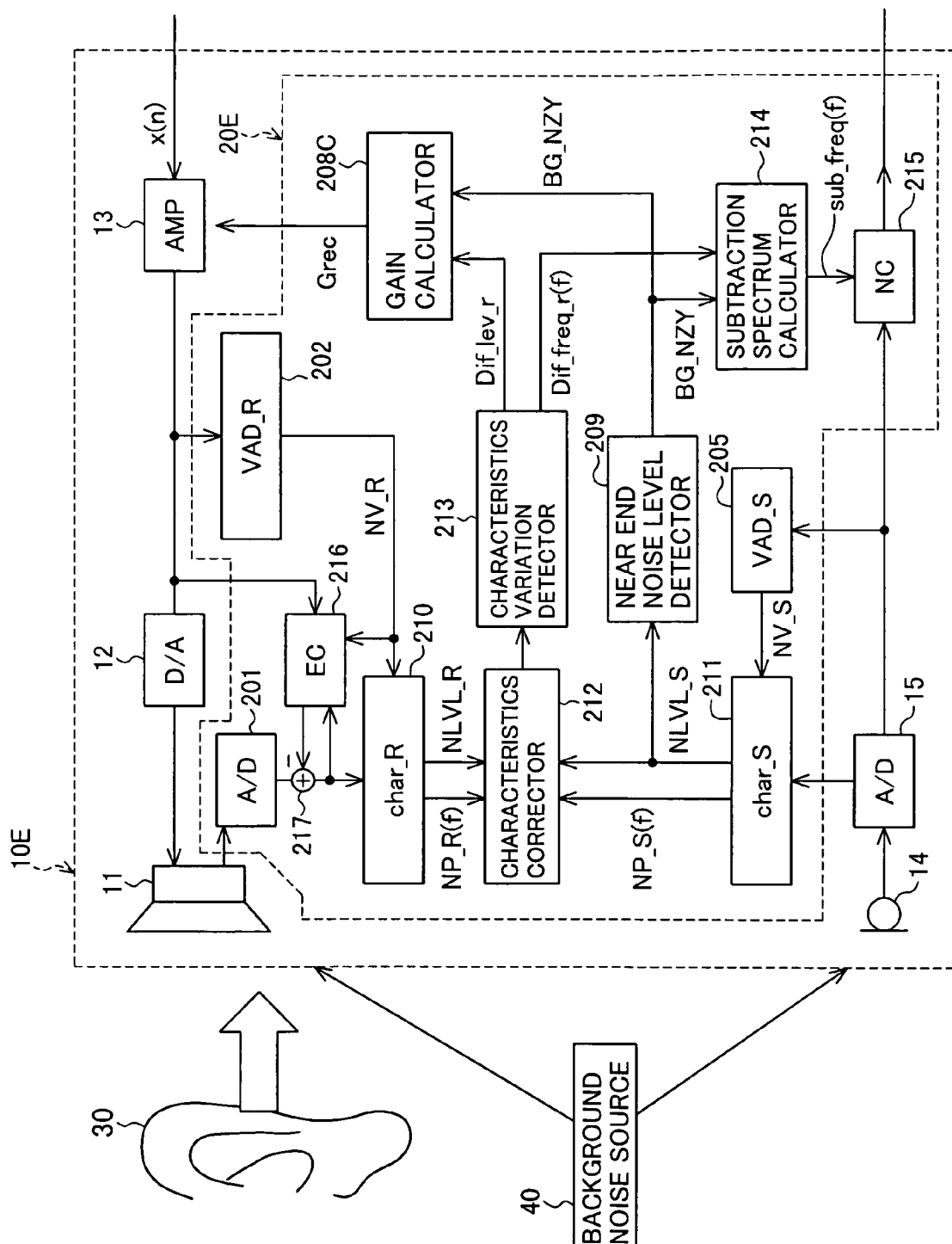
FIG. 11 is a block diagram of a sound signal adjustment apparatus according to a sixth embodiment of the invention.

Referring to the block diagram in FIG. 11, the sound signal adjustment apparatus 20E in the telephone 10E in the sixth embodiment differs from the fifth embodiment by including an echo canceler (EC) 216 and an adder 217, and by using the receiving voice activity detector 202 of the first embodiment instead of the receiving voice activity detector 202B of the third embodiment. The purpose of the receiving voice activity detector 202B in the third embodiment was to improve the accuracy of volume control by eliminating echoes of far end noise. In the sixth embodiment this purpose is achieved by using the echo canceler 216 and adder 217 instead. The adder 217 functions as a subtractor, as indicated by the minus sign near the input from the echo canceler 216.

The echo canceler 216 receives the digital far end signal output from the amplifier 13, uses an adaptive filter (not shown) to predict the echo the far end signal will produce in the signal picked up by the speaker, and supplies the predicted echo signal to the adder 217, which subtracts the predicted echo from the signal output by ADC 201 and supplies the residual signal to the received signal characteristics calculator 210. The echo canceler 216 also receives the residual signal as feedback.

The operation of the echo canceler 216 is controlled by the NV_R signal output by the receiving voice activity detector 202. When the NV_R signal is inactive, indicating that voice activity is detected in the output signal from AMP 13 (far end signal), the echo canceler 216 adapts the coefficients of its adaptive filter so as to minimize the power of the feedback signal from the adder 217. The well-known normalized least mean squares (NLMS) algorithm or least mean squares (LMS) algorithm may be used as the adaptive algorithm.

When the NV_R signal from the receiving voice activity detector 202 is active, indicating that voice activity is not detected in the output signal from AMP13 (far end signal), the echo canceler 216 halts the adaptation process but continues to predict the far end echo, using the existing filter coefficients, and the adder 217 continues to remove the predicted echo from the output of ADC 201.

Although the sound signal adjustment apparatus 20E shown in FIG. 11 is a modification of the sound signal adjustment apparatus 20D in FIG. 8 in the fifth embodiment, the same modification can be made to the sound signal adjustment apparatus 20 in the first embodiment, the sound signal adjustment apparatus 20A in the second embodiment, and the sound signal adjustment apparatus 20C in the fourth embodiment, by adding the echo canceler 216 and adder 217, and by replacing the receiving voice activity detector 202B in the fourth embodiment with the receiving voice activity detector 202.

The sixth embodiment operates in the same way as the fifth embodiment except that when the NV_R signal is active, the receiving voice activity detector 202 continues to supply the far end signal to the DAC 12, and the echo canceler 216 and the adder 217 operate to remove the echo of the far end signal from the external sound signal picked up by the speaker 11. More specifically, when voice activity is detected in the far end signal, providing a strong far end echo, the echo canceler 216 identifies the characteristics of the echo loop path by using an algorithm such as the NLMS algorithm. When voice activity is not detected in the far end signal, the echo canceler 216 uses the identified characteristics to predict the echo of far end noise that will be present in the output of ADC 201, so that the adder 217 can remove the far end noise echo.

An advantage of the sixth embodiment over the first and second embodiments is that the operation of the sound signal adjustment apparatus 20E is not disturbed by far end noise. An advantage of the sixth embodiment over the third to fifth embodiments is that the far end signal does not suddenly go dead when the far end party stops talking. By continuing to reproduce far end noise, the sixth embodiment reassures the near end party that the telephone is working properly and the call has not been cut off. Although sound quality preferences differ from user to user, it is a fact that most users prefer hearing the naturally continued far end noise to having the unnatural far end signal periodically interrupted.

Seventh Embodiment

Figure 12:
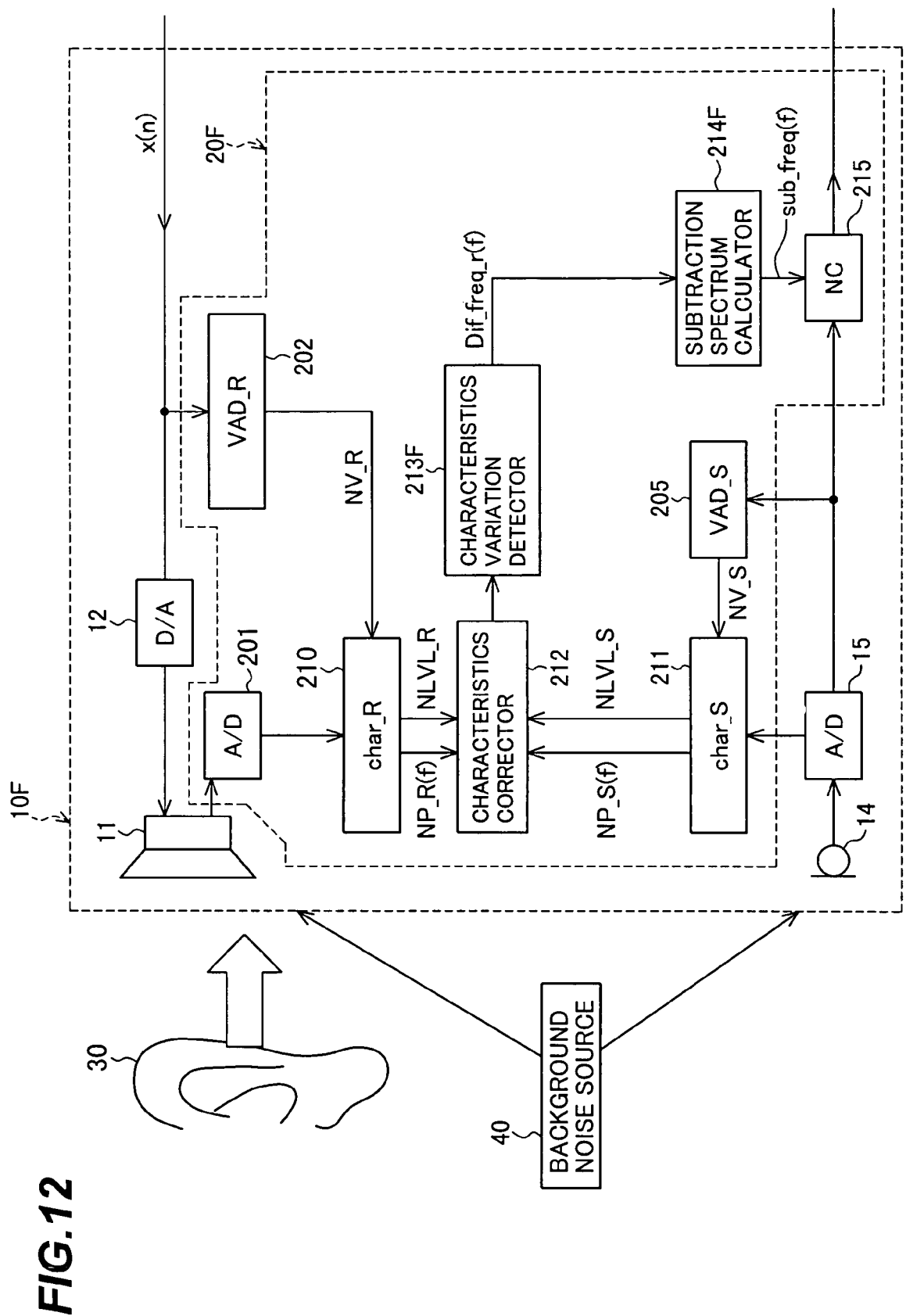
FIG. 12 is a block diagram of a sound signal adjustment apparatus according to a seventh embodiment.

Referring to the block diagram in FIG. 12, the telephone 10F in the seventh embodiment differs from the sixth embodiment by omitting the elements used for volume control while retaining the elements essential for noise reduction, including a modified characteristics variation detector 213F and a modified subtraction spectrum calculator 214F. The elements omitted from the sound signal adjustment apparatus 20F in the seventh embodiment are the gain calculator 208C and, optionally, the near end noise level detector 209, echo canceler 216, and adder 217 of the sixth embodiment. The amplifier 13 may be included if needed by the telephone 10F, or may be omitted, as shown, if not needed.

When the echo canceler 216 and adder 217 are omitted, the seventh embodiment may use the receiving voice activity detector 202 of the first and sixth embodiments, as shown. Alternatively, the receiving voice activity detector 202B of the fifth embodiment may be used for improved noise reduction accuracy. If the echo canceler 216 and the adder 217 of the sixth embodiment are included in the sound signal adjustment apparatus 20F, the receiving voice activity detector 202 of the first and sixth embodiment should be used.

The difference between the characteristics variation detector 213F of the seventh embodiment and the characteristics variation detector of the sixth embodiment is that, since the seventh embodiment lacks the gain calculator 208C of the sixth embodiment, the characteristics variation detector 213F does not output and need not even calculate the quantity Dif_lev_r.

The difference between the subtraction spectrum calculator 214F of the seventh embodiment and the subtraction spectrum calculator 214 of the fifth and sixth embodiments is that the subtraction spectrum calculator 214F in the seventh embodiment calculates the noise subtraction frequency spectrum Sub_freq(f) from the difference spectrum Dif_freq_r(f) without using the detection signal BG_NZY. The subtraction spectrum calculator 214F may calculate Sub_freq(f) by equation (13), using parameter C51, regardless of the near end noise level. Alternatively, equation (14) and parameter C52 may be used regardless of the near end noise level, or another equation or parameter value may be used.

The sound signal adjustment apparatus 20F in the seventh embodiment may also include the near end noise level detector 209 of the fifth and sixth embodiments and the subtraction spectrum calculator 214F may calculate the noise subtraction frequency spectrum Sub_freq(f) by using both equations (13) and (14), or using one of the other methods mentioned in the fifth and sixth embodiments. For example, the value of C51 in equation (13) may be adjusted according to the value of the NLVL_S signal, subject to the condition that the Sub_freq(f) values when the detection signal BG_NZY is active remain equal to or greater than the values when the detection signal BG_NZY is inactive.

The volume control operation (sound signal adjustment method) of the sound signal adjustment apparatus 20F will now be described.

When the NV_R signal from the receiving voice activity detector 202 is active, indicating that voice activity is not detected in the far end signal, the received signal characteristics calculator 210 calculates the level NLVL_R and frequency spectrum NP_R(f) of the signal received from the speaker 11 through ADC 201, and supplies NLVL_R and NP_R(f) to the characteristics corrector 212.

When the NV_S signal from the sending voice activity detector 205 is active, indicating that voice activity is not detected in the near end signal, the sending signal characteristics calculator 211 calculates the level NLVL_S and frequency spectrum NP_S(f) of the signal received from the microphone 14 through ADC 15, and supplies NLVL_S and NP_S(f) to the characteristics corrector 212.

When the characteristics corrector 212 receives these signals from the received signal characteristics calculator 210 and sending signal characteristics calculator 211, the characteristics corrector 212 adjusts NLVL_R and NP_R(f) to obtain a compensated level NLVL_R_r and a compensated frequency spectrum NP_R_r(f), and supplies the compensated level NLVL_R_r and compensated frequency spectrum NP_R_r(f) together with NLVL_S and NP_S(f) to the characteristics variation detector 213F.

When condition (4) is satisfied and condition (5) is not satisfied, the characteristics variation detector 213F decides that external sound is being blocked from reaching the speaker 11 by the user's ear 30, calculates the difference spectrum Dif_freq_r(f) by using equation (12), and supplies the difference spectrum Dif_freq_r(f) to the subtraction spectrum calculator 214F.

The subtraction spectrum calculator 214F calculates the noise subtraction frequency spectrum Sub_freq(f) from the difference spectrum Dif_freq_r(f), and supplies Sub_freq(f) to the spectral subtraction unit 215. The spectral subtraction unit 215 reduces noise in the near end signal by subtracting Sub_freq(f) from the frequency spectrum of the near end signal, and outputs the noise-reduced near end signal to the far end party.

The seventh embodiment uses the speaker 11 as an acoustic-to-electric transducer only for the purpose of detecting the frequency spectrum of the near end noise generated by the background noise source 40. For noise reduction, this frequency spectrum detection method provides the same advantages as in the fifth and sixth embodiments.

The invention is not limited to the first to seventh embodiments. The following are some of the possible variations.

The telephone need not be a portable telephone. The invention is applicable to transceivers and other types of telephones, including landline telephones.

The long-term average ABS_L(n) of the signal level or the short-term average ABS_S(n) calculated by the sending voice activity detector 205 may be used instead of the level NLVL_S calculated by the sending level calculator 204. The sending level calculator 204 can then be eliminated. The receiving level calculator 203 may calculate a similar long-term or short-term average of the external sound signal.

If the signal from ADC 201 has an adequate dynamic range, the NLVL_R level may be used without compensation. The level corrector 206 can then be eliminated from the first to fourth embodiments, the NLVL_R and NLVL_S levels can be supplied directly to the level variation detector, and a simpler, more compact, and more energy-efficient telephone can be obtained.

The NLVL_R level may be obtained from sound reaching a microphone near the speaker 11 instead of from the speaker itself as in the preceding embodiments.

Those skilled in the art will recognize that further variations are possible within the scope of the invention, which is defined in the appended claims.

What is claimed is:

1. A sound signal adjustment apparatus for adjusting a far end signal in a telephone having a microphone for picking up a near end signal, an amplifier for amplifying the far end signal, and a speaker for reproducing the amplified far end signal, the sound signal adjustment apparatus comprising:
a sound capturing unit for converting external sound reaching the speaker to an external sound signal;
a decision unit for deciding from the external sound signal captured by the sound capturing unit and the near end signal picked up by the microphone whether the external sound is being externally blocked from reaching the speaker; and
a volume control unit for setting the amplifier to a higher gain when the decision unit decides that the external sound is being externally blocked than when the decision unit decides that the external sound is not being externally blocked, thereby increasing a volume of the reproduced far end signal when the decision unit decides that the external sound is being externally blocked.

2. The sound signal adjustment apparatus of claim 1, wherein the sound capturing unit uses the speaker as an acoustic-to-electric transducer for converting the external sound to the external sound signal.

3. The sound signal adjustment apparatus of claim 1, wherein the decision unit includes a compensation unit for compensating at least one of the external sound signal and the near end signal to compensate for a difference in performance between the external sound capturing unit and the microphone, and the decision unit decides whether the external sound is being blocked based on the result of the compensation.

4. The sound signal adjustment apparatus of claim 1, wherein the decision unit includes a blocking calculation unit for calculating a blocking factor indicating a degree to which the external sound is being blocked, and the volume control unit adjusts the gain of the amplifier according to the calculated blocking factor.

5. The sound signal adjustment apparatus of claim 4, wherein the volume control unit performs control such that the reproduced far end signal has a volume corresponding to the degree to which the external sound is being blocked, as calculated by the blocking calculation unit, when the decision unit decides that the external sound is being blocked.

6. The sound signal adjustment apparatus of claim 1, further comprising:
a far end voice activity detector for detecting voice activity in the far end signal; and
a near end voice activity detector for detecting voice activity in the near end signal; wherein
the decision unit decides whether or not the external noise is being blocked only when the far end voice activity detector and the near end voice activity detector both indicate no voice activity.

7. The sound signal adjustment apparatus of claim 6, wherein the far end voice activity detector allows the far end signal to reach the speaker only when voice activity is detected in the far end signal.

8. The sound signal adjustment apparatus of claim 6, further comprising a noise level detector for detecting an ambient noise level from the near end signal when the near end voice activity detector does not detect voice activity in the near end signal and the far end voice activity detector does not detect voice activity in the far end signal, and outputting a noise level signal indicating the detected ambient noise level, wherein the volume control unit also adjusts the gain of the amplifier according to the noise level signal, and the gain is equivalent to the volume of the speaker.

9. The sound signal adjustment apparatus of claim 1, further comprising:
a characteristics calculator for determining a frequency spectrum of the external sound signal;
a characteristics variation detector for determining a difference frequency spectrum representing a difference between the frequency spectrum of the external sound signal when the external sound is being blocked and the frequency spectrum of the external sound signal when the external sound is not being blocked; and a noise reducer for using the difference spectrum determined by the spectral difference calculator to reduce noise in the near end signal.

10. The sound signal adjustment apparatus of claim 1, further comprising:

a characteristics calculator for determining a frequency spectrum of the external sound signal;

a characteristics variation detector for determining a difference frequency spectrum representing a difference between the frequency spectrum determined by the characteristics calculator when the decision unit decides that the external sound is being blocked and the frequency spectrum determined by the characteristics calculator when the decision unit decides that the external sound is not being blocked; and a noise reducer for using the difference spectrum determined by the spectral difference calculator to reduce noise in the near end signal.

11. The sound signal adjustment apparatus of claim 1, further comprising an echo canceler for removing an echo of the reproduced far end signal from the external noise signal.

12. A telephone including the far end signal adjusting apparatus of claim 1.

13. The telephone of claim 12, wherein the speaker is an ear speaker of the telephone, and the sound capturing unit uses the speaker as an acoustic-to-electric transducer for converting the external sound to the external sound signal.

14. A method of adjusting a far end signal in a telephone having a microphone for picking up a near end signal, an amplifier for amplifying the far end signal, and a speaker for reproducing the amplified far end signal, the method comprising:

a conversion step of converting external sound reaching the speaker to an external sound signal;

a decision step of deciding from the external sound signal and the near end signal picked up by the microphone whether the external sound is being externally blocked from the external sound signal; and a setting step of setting the amplifier to a higher gain when the external sound is being externally blocked than when the external sound is not being externally blocked, thereby increasing a volume of the reproduced far end signal when the external sound is being externally blocked.

15. The method of claim 14, wherein converting external sound reaching the speaker to an external sound signal further comprises using the speaker as an acoustic-to-electric transducer.

16. The method of claim 14, further comprising:

a characteristics calculation step of determining a frequency spectrum of the external sound signal;

a characteristics variation detection step of determining a difference spectrum representing a difference between the frequency spectrum of the external sound signal when the external sound is being blocked and the frequency spectrum of the external sound signal when the external sound is not being blocked; and a noise reducing step of using the difference spectrum to reduce noise in the near end signal.

17. The method of claim 14, further comprising:

a characteristics calculation step of determining a frequency spectrum of the external sound signal;

a characteristics variation detection step of determining a difference frequency spectrum representing a difference between the frequency spectrum determined by the characteristics calculator when the decision unit decides that the external sound is being blocked and the frequency spectrum determined by the characteristics calculator when the decision unit decides that the external sound is not being blocked; and a noise reducing step of using the difference spectrum determined by the spectral difference calculator to reduce noise in the near end signal.

18. The method of claim 14, further comprising canceling an echo of the far end signal in the external sound signal.

19. A machine-readable tangible mom-transitory medium storing instructions executable by a computing device for adjusting a far end signal in a telephone by the method of claim 14.

* * * * *